(12) United States Patent
Arai

(10) Patent No.: US 7,066,035 B2
(45) Date of Patent: Jun. 27, 2006

(54) TORQUE MEASURING DEVICE FOR ROTATING BODY

(75) Inventor: Tooru Arai, Kanagawa-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 291 days.

(21) Appl. No.: 10/727,771

(22) Filed: Dec. 4, 2003

(65) Prior Publication Data

US 2004/0123678 A1     Jul. 1, 2004

(30) Foreign Application Priority Data

Dec. 26, 2002     (JP)     ............................. 2002-377131

(51) Int. Cl.
*G01L 3/14*     (2006.01)

(52) U.S. Cl. ........................... 73/862.324; 73/862.325; 356/152.3

(58) Field of Classification Search ........... 73/862.324, 73/862.325, 862.338, 862.331; 356/152.3, 356/218

See application file for complete search history.

(56) References Cited

U.S. PATENT DOCUMENTS 5,490,431 A * 2/1996 O'Mahony et al. .... 73/862.331
5,907,106 A    5/1999 Segar

FOREIGN PATENT DOCUMENTS

| EP | 1130373 | 9/2001 |
|---|---|---|
| EP | 1170577 | 1/2002 |
| WO | WO 99 05493 | 2/1999 |

OTHER PUBLICATIONS

Patent Abstracts of Japan, vol. 1995, No. 01, Feb. 28, 1995 & JP 06 301881 A (Kyowa Electron Instr Co Ltd) Oct. 28, 1994.
Patent Abstracts of Japan, vol. 2002, No. 3, Apr. 3, 2002 & JP 2001 330525 (Minebea Co Ltd) Nov. 30, 2001.

* cited by examiner

*Primary Examiner*—Layla G. Lauchman
(74) *Attorney, Agent, or Firm*—Fay, Sharpe, Fagan, Minnich & McKee, LLP

(57) ABSTRACT

A torque measuring device for a rotating body comprises: a rotary section composed of first and second flanges to be joined respectively to driving and driven shafts, and a hollow cylinder having the first and second flanges formed respectively on both edges thereof; torque detectors provided at an inner circumference of the cylinder; light emitting elements provided at an outer circumference of the rotary section and adapted to emit light according to an output from the torque detectors thereby generating an optical signal; a light receiving fiber disposed outside the rotary section and adapted to receive the optical signal from the light emitting elements; and a rotary transformer composed of a primary coil constituted by an annulus with two-part separable structure disposed outside the rotary section and a secondary coil provided at the outer circumference of the rotary section, and adapted to supply electrical power to the rotary section.

5 Claims, 6 Drawing Sheets

PRIOR ART

PRIOR ART

TORQUE MEASURING DEVICE FOR ROTATING BODY

BACKGROUNF OF THE INVENTION

1. Field of the Invention

The present invention relates to a torque measuring device to measure a torque of a rotating body without contact with its rotating portion, and particularly to a torque measuring device with increased ease in attaching a light receiving fiber and in performing maintenance.

2. Description of the Related Art

A torque measuring device for a rotating body is set between a driving shaft powered and a driven shaft loaded and measures a rotating torque without contact with the rotating portion of a rotating body. Such a torque measuring device is disclosed in Japanese Patent Publication No. 2002-22566, which is used, for example, to measure a rotating torque between a measurement roller and a brake system in a chassis dynamo rotated by a wheel of a vehicle.

FIG. 1 is a partly cut away and cross-sectioned side view of a conventional torque measuring device for a rotating body, and FIG. 2 is a partly cut away front view of the conventional torque measuring device of FIG. 1. As shown in FIGS. 1 and 2, a conventional torque measuring device for a rotating body 50 comprises: a rotary section 51 rotatably disposed between a driving shaft 91 powered and a driven shaft 93 loaded; and a stationary section 55 fixedly disposed so as to surround the rotary section 51. The rotary section 51 integrally comprises: a first flange 52 to be bolted to a driving shaft flange 92 of the driving shaft 91; a second flange 54 to be bolted to a driven shaft flange 94 of the drive shaft 93; and a cylinder 53 having a hollow 59, and having the first and second flanges 52 and 54 formed respectively on both edges thereof. The stationary section 55 comprises: an annulus 56 located so as to surround the second flange 54; and a chassis 57 to which the annulus 56 is fixedly attached via attaching members 58.

A primary coil 82 is provided at the inner circumference of the annulus 56, and a secondary coil 83 is provided at the outer circumference of the second flange 54. The primary and secondary coils 82 and 83 in combination constitute a rotary transformer 81, thereby supplying electric power to the rotary section 51.

Torque detectors 61 as strain gauges are provided at the inner circumference of the cylinder 53, a plurality of light emitting elements 67, which are adapted to emit light according to an output from the torque detectors 61 thereby outputting an optical signal, are provided at the outer circumference of the second flange 54 so as to be arrayed along the secondary coil 83, a light receiving fiber 71 for receiving the optical signal from the light emitting elements 67 is provided along the primary coil 82 on the inner circumference of the annulus 56, and optical-electrical signal converters (not shown) for converting the optical signal into an electrical signal are provided at the ends of the light receiving fiber 71.

In the torque measuring device 50, when the driving shaft 91 rotates, the output from the torque detectors 61 is carried via the light emitting elements 67 and the light receiving fiber 71, and detected by the optical-electrical signal converters (not shown), thus measuring a rotary torque.

As described above, the conventional torque measuring device 50 is set between the driving shaft powered and the driven shaft loaded and can measure a rotary torque between a rotating body and a load without contact with the rotating shaft or the rotating portion of the rotating body. However, since the characteristic of the optical signal received by the light receiving fiber 71 may be impaired when the light receiving fiber 71 is damaged, the light receiving fiber 71 must be cautiously attached along a groove formed on the inner circumference of the annulus 56, thus hindering the workability. And, since oil mist generation is often involved in the measurement of the torque for a rotating body, the maintenance work such as changing the light receiving fiber 71 or cleaning are desired to be done easily.

SUMMARY OF THE INVENTION

The present invention has been made in view of the above circumstances and it is an object of the present invention to provide a torque measuring device for a rotating body in which the workability in attaching a light receiving fiber and performing maintenance is improved.

In order to achieve the above described aim, according to a first aspect of the present invention, a torque measuring device for a rotating body comprises: a rotary section composed of a first flange to be joined to a driving shaft powered, a second flange to be joined to a driven shaft loaded, and a cylinder having a hollow and having the first and second flanges formed respectively on both edges thereof; a plurality of torque detectors provided at an inner circumference of the cylinder; at least one light emitting element provided at an outer circumference of the rotary section and adapted to emit light according to an output from the torque detectors thereby generating an optical signal; a light receiving fiber disposed outside the rotary section and adapted to receive the optical signal from the light emitting element; and a rotary transformer composed of a primary coil constituted by an annulus which is disposed to surround the rotary section and which is of two-part separable structure and a secondary coil provided at the outer circumference of the rotary section, and adapted to supply electrical power to the rotary section. With the structure described above, the light receiving fiber is disposed outside the rotary section, specifically inside a chassis located outside the rotary section, the light receiving fiber can be attached easily, and the annulus can be attached and detached easily due to its two-part separable structure.

According to a second aspect of the present invention, the torque measuring device of the first aspect includes a plurality of light emitting elements, and the light receiving fiber has a predetermined receiving length so as to receive at least one optical signal from the light emitting elements constantly and continuously regardless of a rotational position of the rotary section. Consequently, a rotary torque can be measured both when the shaft stops its rotation with the rotary torque acting thereon and when the shaft rotates slowly.

According to a third aspect of the present invention, in the torque measuring device of the first or second aspect, the light receiving fiber has right-angle bends formed respectively at its both end portions. Consequently, the light receiving fiber, together with other components, can be installed efficiently inside the chassis.

According to a fourth aspect of the present invention, in the torque measuring device of the third aspect, shields for blocking out the optical signal from the light emitting elements are provided respectively at the right-angle bends of the light receiving fiber. Consequently, the difference in the amount of light received by the light receiving fiber depending on its receiving area is substantially diminished thus preventing impairment of the characteristics of the optical signal.

According to a fifth aspect of the present invention, in the torque measuring device of the second aspect, the predetermined receiving length of the light receiving fiber is adapted to receive either one or two optical signals from the light emitting elements regardless of the rotational position of the rotary section. Consequently, the light receiving fiber can receive the optical signal from the light emitting elements constantly and continuously, whereby a rotary torque can be measured in an appropriate manner.

BRIEF DESCRIPTION OF THE DRAWINGS

The present invention is explained with reference to the drawings, which are presented for the purpose of illustration only and in no way limit the invention, and in which:

FIGS. 5A to 5C are explanatory views of how a light receiving fiber of the torque measuring device receives optical signals from light emitting elements, wherein FIG. 3A shows the light receiving fiber with a receiving length L receives, at its both end portions, respective optical signals from two adjacent light emitting elements, FIG. 3B shows the light emitting elements have moved in a direction indicated by an arrow R, and FIG. 3C shows the light emitting elements have further moved in the direction R.

DETAILED DESCRIPTION OF THE PREFERRED EMBODIMENTS

A preferred embodiment of the present invention will hereinafter be described with reference to the accompanying drawings.

Figure 1:
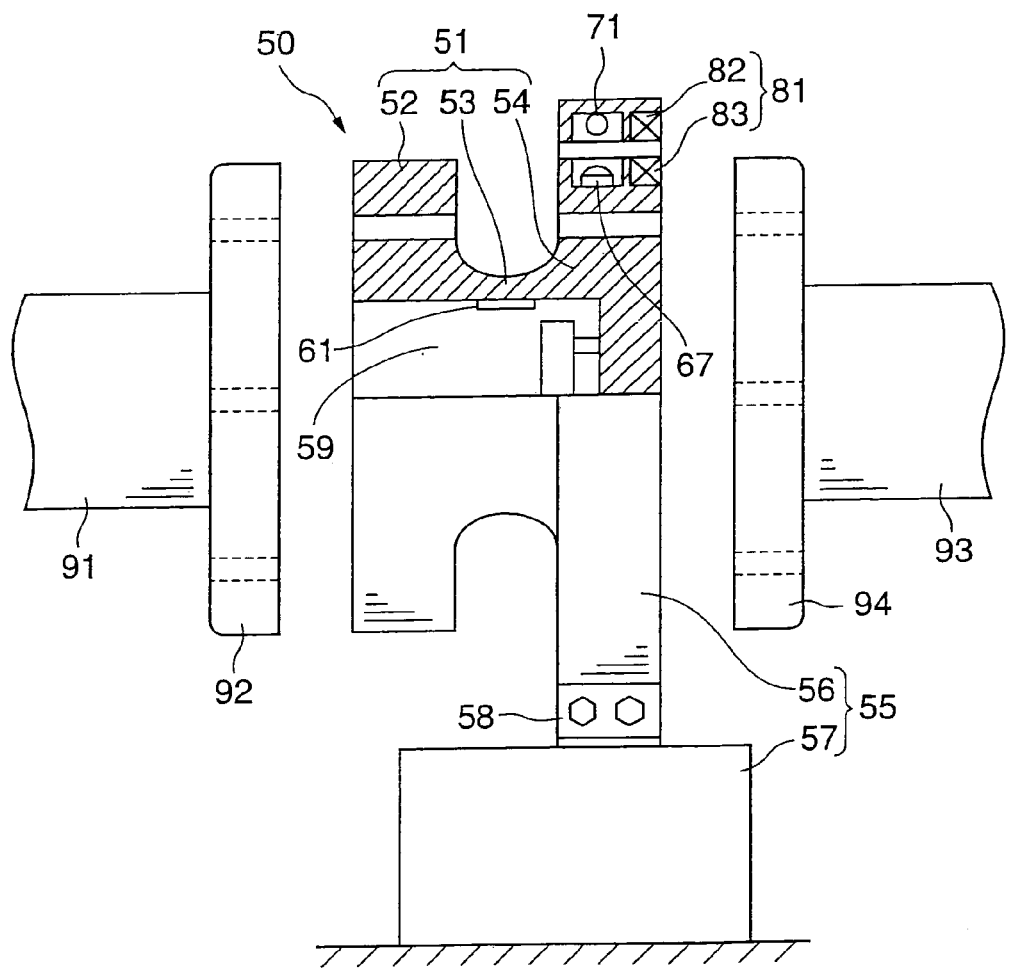
FIG. 1 is a partly cut away and cross-sectioned side view of a conventional torque measuring device for a rotating body.
Figure 2:
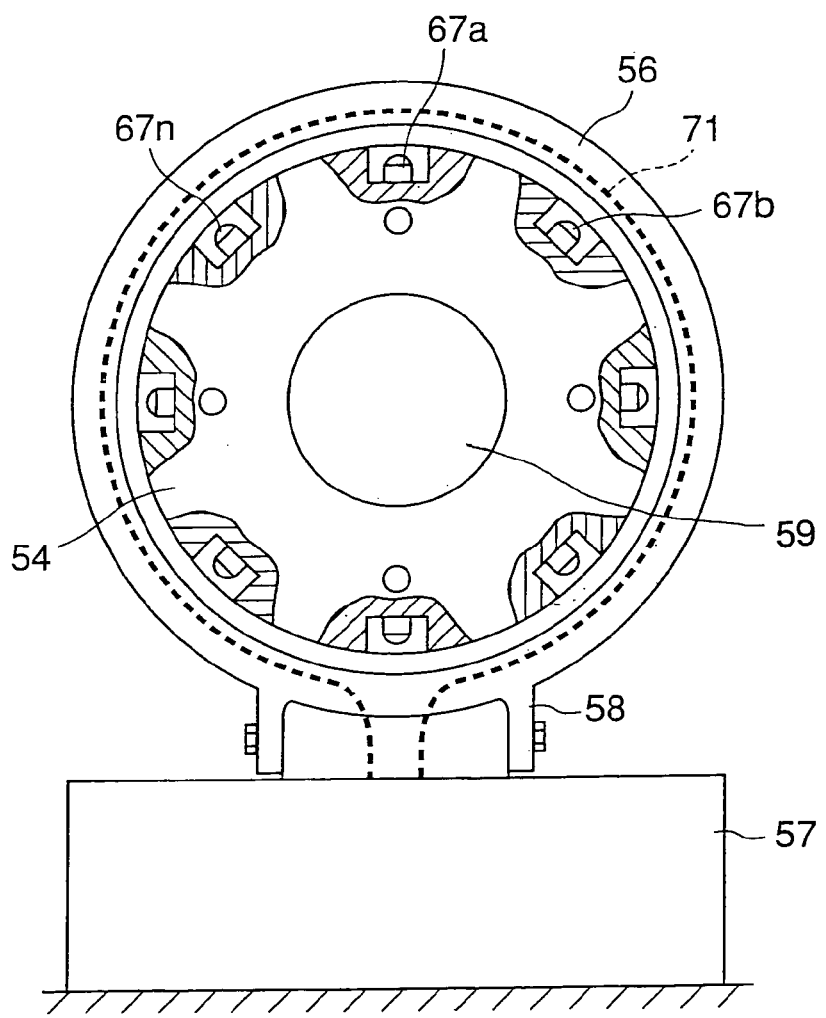
FIG. 2 is a partly cut away front view of the conventional torque measuring device of FIG. 1.
Figure 3:
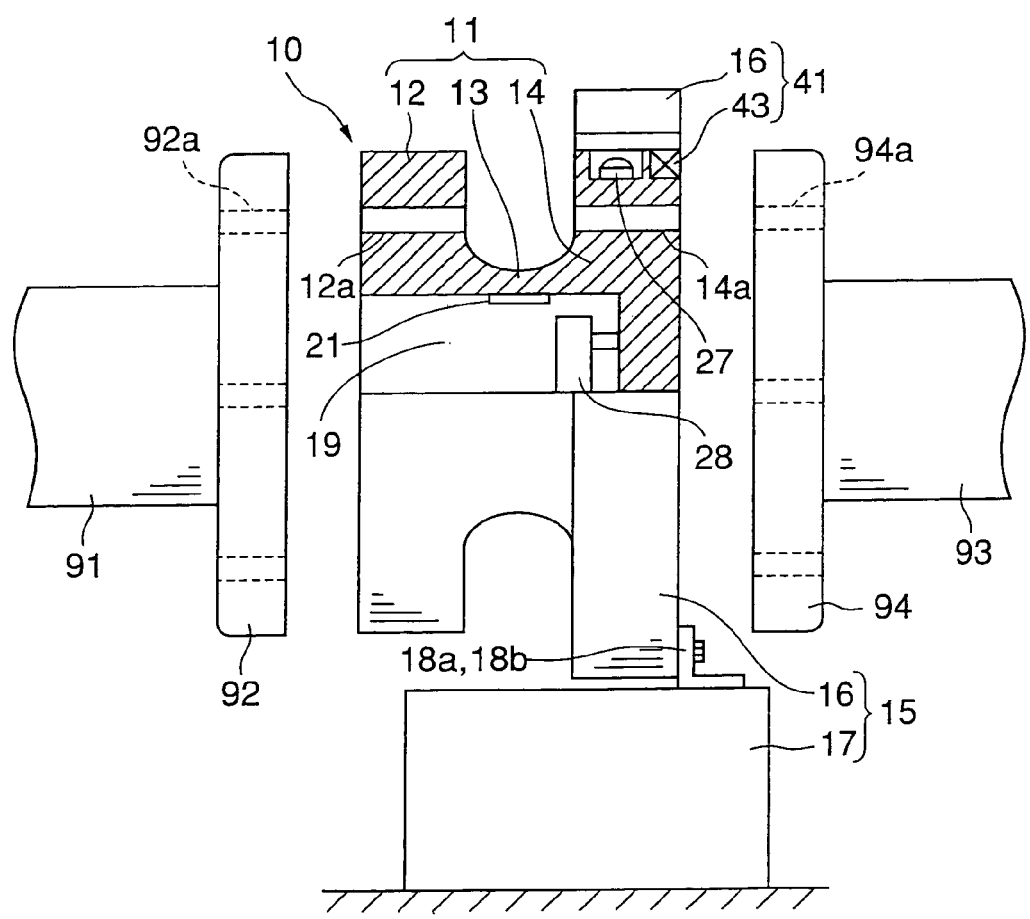
FIG. 3 is a partly cut away and cross-sectioned side view of a torque measuring device for a rotating body according to the present invention.
Figure 4:
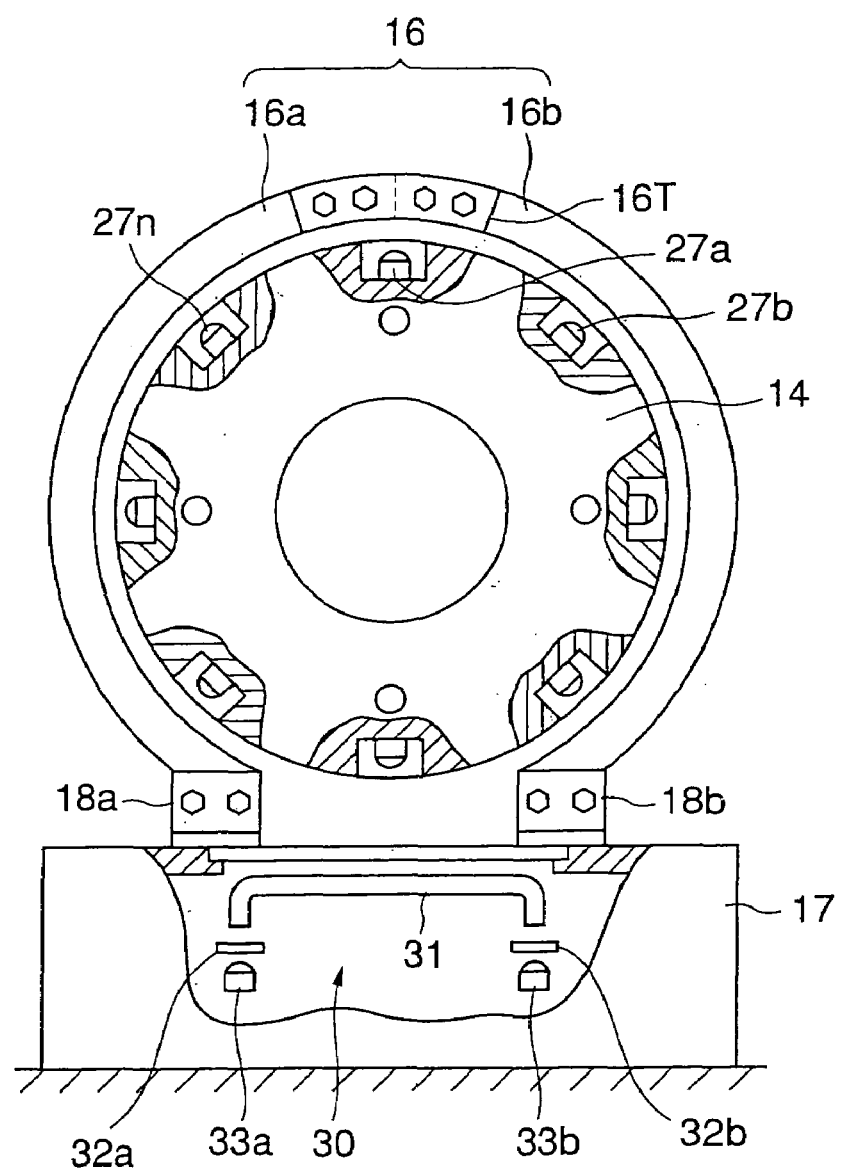
FIG. 4 is a partly cut away front view of the torque measuring device of FIG. 1.

Referring to FIGS. 3 and 4, a torque measuring device for a rotating body 10 comprises: a rotary section 11 rotatably disposed between a driving shaft 91 powered and a driven shaft 93 loaded; and a stationary section 15 fixedly disposed so as to surround the rotary section 11. The rotary section 11 integrally comprises: a first flange 12 to be bolted to a driving shaft flange 92 of the driving shaft 91; a second flange 14 to be bolted to a driven shaft flange 94 of the driven shaft 93; and a cylinder 13 having a hollow 19, and having the first and second flanges 12 and 14 formed respectively on both edges thereof. The stationary section 15 comprises: an annulus 16 composed of two semi-annulus sections 16a and 16b and located around the second flange 14; and a chassis 17 to which the annulus 16 is fixedly attached.

The first flange 12 is firmly joined to the driving shaft flange 92 by means of a plurality of bolts (not shown) going through lug holes 92a of the driving shaft flange 92 and lug holes 12a of the first flange 12. The second flange 14 is firmly joined to the driven shaft flange 94 by means of a plurality of bolts (not shown) going through lug holes 94a of the driven shaft flange 94 and lug holes 14a of the second flange 14. With the structure described above, when the driving shaft 91 rotates, the cylinder 13 is twisted to be distorted by the driving shaft flange 92 powered and the driven shaft flange 94 loaded.

The two semi-annulus sections 16a and 16b have their respective one ends (upper side in the figure) connected to each other via a connecting member 16T, and have the other ends (lower side in the figure) insulatedly fixed to attaching members 18a and 18b, respectively, which are attached to the chassis 17. Thus, since the annulus 16 comprises the two semi-annulus sections 18a and 18b so as to have a discontinuity at its lower part and is fixed in an insulated manner, the annulus 16 works as a primary coil 42 (see FIG. 6). The primary coil 42 thus formed and a secondary coil 43 provided at the outer circumference of the second flange 14, in combination, constitute a rotary transformer 41, whereby electric power can be supplied to the rotary section 11.

Torque detectors 21 as strain gauges are provided at the inner circumference of the cylinder 13, and a plurality (eight in the embodiment as described later) of light emitting elements 27 adapted to emit light according to an output from the torque detectors 21 are provided at the outer circumference of the second flange 14 and arrayed at a regular interval. A light receiving fiber 31, which is shaped linear, has its both end portions bent at a right angle for efficient installation, and which is adapted to receive optical signals from the light emitting elements 27, is disposed inside the chassis 17. First and second optical-electrical signal converters 33a and 33b (hereinafter referred to as signal converter) for detecting optical signals and converting the optical signals into electrical signals are provided so as to face respective end surfaces of the light receiving fiber 31 via first and second optical high-pass filters 32a and 32b, respectively. A board 28 is provided inside the cylinder 13 and electric components for the rotary section 11 are mounted on the board 28.

Figure 5A:
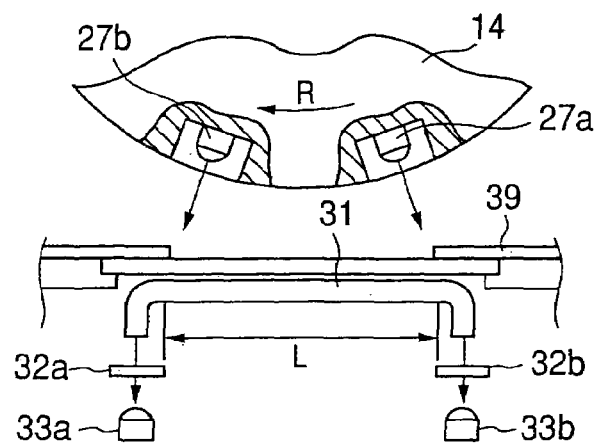

In the torque measuring device 10 of the present invention, the number of the light emitting elements 27 and a receiving length L (to be detailed later with reference to FIG. 5A) of the light receiving fiber 31 are appropriately determined so that a rotary torque can be measured both when the shaft stops its rotation with the rotary torque acting thereon and when the shaft rotates slowly. To this end, the light receiving fiber 31 must be capable of receiving at least one optical signal from any one of the light emitting elements 27 constantly and two optical signals from adjacent light emitting elements 27 at certain rotational positions of the second flange 14 of the rotary section 11. Specifically, the light receiving fiber 31 has its receiving length L determined such that the light receiving fiber 31 can receive, at both end portions of the length L, respective optical signals from two adjacent light emitting elements 27a and 27b as shown in FIG. 5A. If the number of the light emitting elements 27 is increased, the receiving length L of the light receiving fiber 31 can be reduced. This, however, results in pushing up the cost, and accordingly the number of the light emitting elements 27 is set to eight in the embodiment as mentioned above, and the receiving length L of the light receiving fiber 31 is determined based on the number of the light emitting elements 27 being set to eight.

Referring to FIG. 5A, an optical signal from the light emitting element 27b is received by the light receiving fiber 31 at the very left end portion of the receiving length L and travels therethrough mostly toward the left side in the figure to be received by the first signal converter 33a via the first optical high-pass filter 32a, and at the same time an optical signal from the light emitting element 27a is received by the light receiving fiber 31 at the very right end portion of the receiving length L and travels therethrough mostly toward the right side in the figure to be received by the second signal converter 33b via the second optical high-pass filter 32b.

Figure 5B:
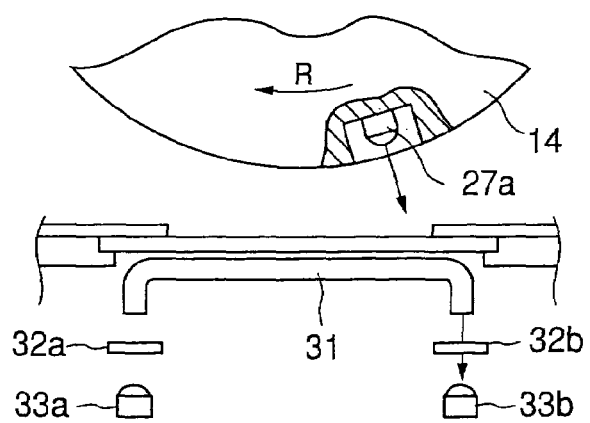

Referring to FIG. 5B, when the second flange 14 is rotated in a direction indicated by an arrow R, the light emitting elements 27a and 27b move in the direction R according to the rotational movement of the second flange 14, which makes the light emitting element 27b positioned such that the optical signal therefrom is not received at any portion of the light receiving fiber 31 while the optical signal from the light emitting element 27a is received at the right side portion thereof.

Figure 5C:
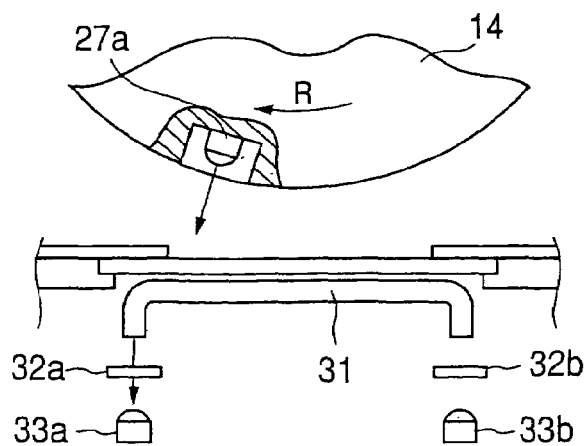

Referring now to FIG. 5C, when the second flange 14 is further rotated in the direction R thereby making the light emitting element 27a further move in the direction R, the light emitting element 27a is now positioned such that the optical signal therefrom is received at the left side portion of the light receiving fiber 31 and travels therethrough mostly toward the left side in the figure to be received by the first signal converter 33b via the first optical high-pass filter 32b. Since the light emitting elements 27a to 27n (see FIG. 4) are arrayed at a regular interval as described above, the receiving optical fiber 31 can receive an optical signal from one or two light emitting elements 27 in a constant and continuous manner.

Due to refraction of the light receiving fiber 31, light is received in a larger amount when it is incident on the bent portions of the light receiving fiber 31 than when incident on the middle portion thereof. Therefore, light shields 39 are provided above the bent portions of the light receiving fiber 31 in order to make the amount of received light as uniform as possible.

Figure 6:
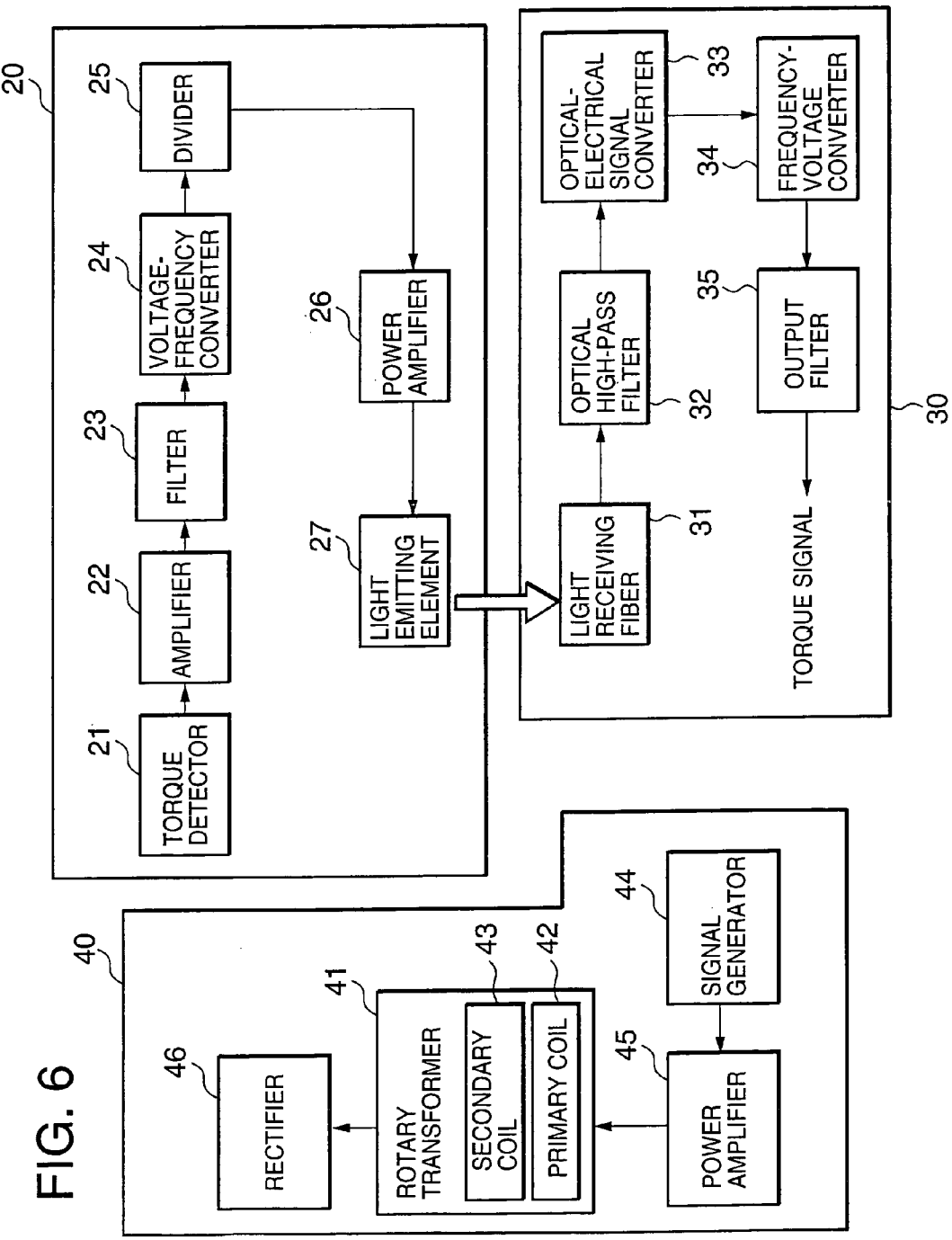
FIG. 6 is a block diagram of detecting a rotary torque in the torque measuring device of FIG. 3.

The operation of the torque measuring device 10 of the present invention will hereinafter be described with reference Blocks 20, 30 and 40 of FIG. 6, respectively showing the rotary section 11, the stationary section 15 and the power supply section.

Referring to the Block 20 for the rotary section 11, an analog output is sent from each of the torque detector 21s, which are formed such that strain gauges are attached onto the inner circumference of the cylinder 13 in the circumferential direction as described above with reference to FIG. 3 and are arranged in a Wheatstone bridge configuration, is amplified by an amplifier 22, denoised by a filter 23, and is converted into a frequency data by a voltage-frequency converter 24. The frequency data from the voltage-frequency converter 24 is divided by a divider 25, then is power-amplified by a power amplifier 26 and is sent out as an optical signal from the light emitting element 27 toward the light receiving fiber 31.

Referring to the Block 30 for the stationary section 15, the aforementioned optical signal from the light emitting element 27 is received by the light receiving fiber 31, has outside light, such as light from a fluorescent lamp, screened off by the optical high-pass filter 32 (32a/32b) and is converted back into a frequency data of an electrical signal by the signal converter 33 (33a/33b). The frequency data of an electrical signal is converted into an analog signal by a frequency-voltage converter 34, is denoised by an output filter 35 and becomes a torque signal. Respective outputs from the signal converters 33a and 33b are aggregately sent to the frequency-voltage converter 34.

Referring now to the Block 40 for the power supply section, a predetermined frequency signal generated by a signal generator 44 provided in the rotary section 11 is power-amplified by a power amplifier 45 provided also in the rotary section 11, sent to a rectifier 46 provided in the rotary section 11 via the aforementioned rotary transformer 41, rectified thereby, and supplied as electrical power for the Block 20. As described above (see FIGS. 3 and 4), the rotary transformer 41 comprises the primary coil 42 constituted by the annulus 16 composed of the two semi-annulus sections 16a and 16b and the secondary coil 43 provided at the outer circumference of the second flange 14.

In the torque measuring device 10 of the present invention in which when the driving shaft 91 rotates, a torque signal which is sent from the torque detector 21 and carried via the light emitting element 27 and the light receiving fiber 31 is detected by the signal converter 33 (33a/33b) thereby measuring a rotary torque, since the annulus 16 which is provided so as to surround the second flange 14 is of two-part separable structure, the annulus 16 can be attached and detached easily, and also since the light receiving fiber 31 is attached to the chassis 17, the light receiving fiber 31 can be attached easily, whereby the workability in attaching and detaching components and performing maintenance can be enhanced.

One light receiving fiber 31 is provided in the above embodiment, but the present invention is not limited thereto but may alternatively include a plurality of light receiving fibers and also may include one or more signal converters 33 provided at each end face of the light receiving fibers 31.

What is claimed is:

1. A torque measuring device for a rotating body, comprising:
    a rotary section composed of a first flange to be joined to a driving shaft powered, a second flange to be joined to a driven shaft loaded, and a cylinder having a hollow and having the first and second flanges formed respectively on both edges thereof;
    a plurality of torque detectors provided at an inner circumference of the cylinder;
    at least one light emitting element provided at an outer circumference of the rotary section and adapted to emit light according to an output from the torque detectors thereby generating an optical signal;
    a light receiving fiber disposed outside the rotary section and adapted to receive the optical signal from the light emitting element; and
    a rotary transformer composed of a primary coil constituted by an annulus which is disposed to surround the rotary section and which is of two-part separable structure and a secondary coil provided at the outer circumference of the rotary section, the rotary transformer being adapted to supply electrical power to the rotary section.

2. A torque measuring device according to claim 1, wherein the torque measuring device includes a plurality of light emitting elements and the light receiving fiber has a predetermined receiving length thereby receiving at least one optical signal from the light emitting elements constantly and continuously regardless of a rotational position of the rotary section.

3. A torque measuring device according to claim 1, wherein the light receiving fiber has right-angle bends formed respectively at its both end portions.

4. A torque measuring device according to claim 3, wherein shields for blocking out the optical signal from the light emitting elements are provided respectively at the right-angle bends of the light receiving fiber.

5. A torque measuring device according to claim 2, wherein the predetermined receiving length of the light receiving fiber is adapted to receive either one or two optical signals from the light emitting elements regardless of the rotational position of the rotary section.

* * * * *